(No Model.)
G. WESTINGHOUSE, Jr.
ELECTRICAL CONVERTER.
No. 366,544. Patented July 12, 1887.
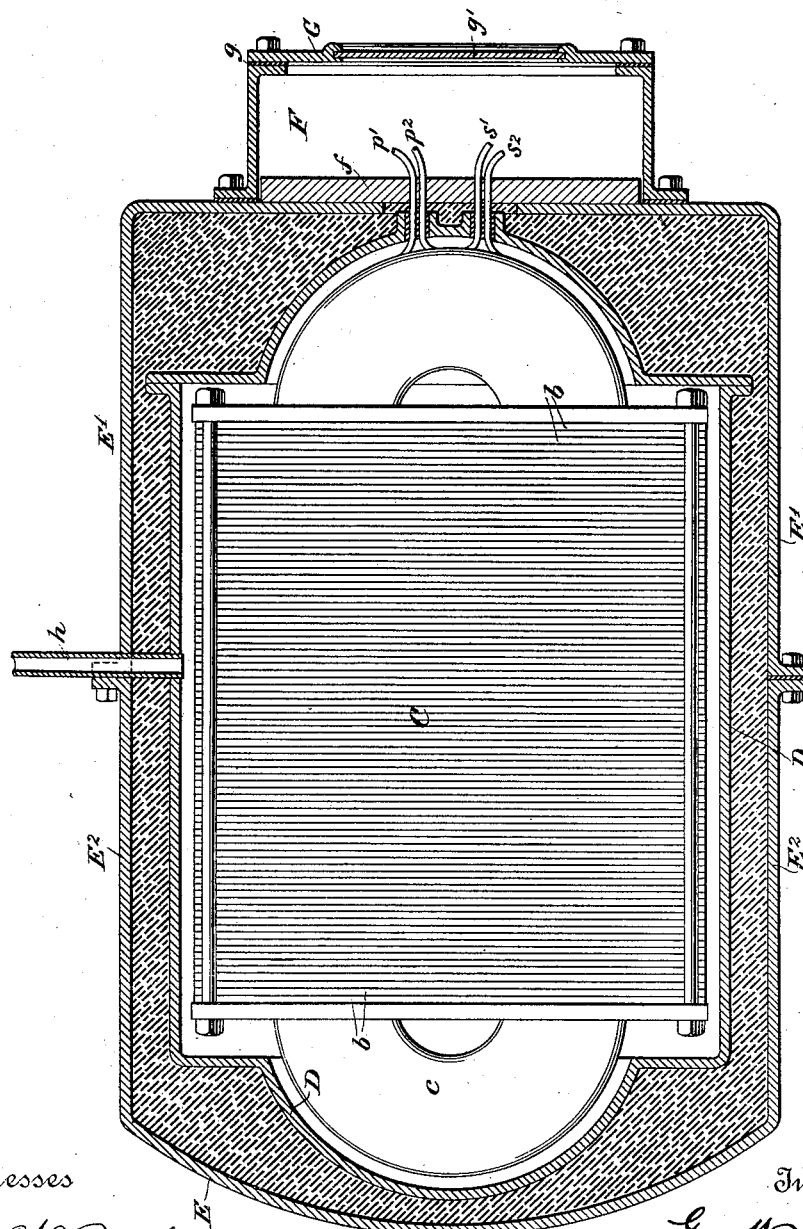
Witnesses
Geo. W. Breck.
Carrie E. Ashley
Inventor
Geo. Westinghouse Jr.
By his Attorneys
Pope & Edgecomb

UNITED STATES PATENT OFFICE.

GEORGE WESTINGHOUSE, JR., OF PITTSBURG, PENNSYLVANIA.

ELECTRICAL CONVERTER.

SPECIFICATION forming part of Letters Patent No. 366,544, dated July 12, 1887.

Application filed December 31, 1886. Serial No. 223,106. (No model.)

*To all whom it may concern:*

Be it known that I, GEORGE WESTINGHOUSE, Jr., a citizen of the United States, residing at Pittsburg, in the county of Allegheny and State of Pennsylvania, have invented certain new and useful Improvements in Electric Converters, of which the following is a specification.

The invention relates to the class of apparatus employed for transforming alternating and intermittent electric currents of any required character into currents differing therefrom in one or both characteristics. For this purpose induction coils or converters are employed, the primary and secondary coils being properly proportioned with reference to their lengths and conductivities.

The presence of moisture, when the converters are kept in more or less damp places, is liable to cause a short circuit in one or both of the coils.

The primary object of this invention is to provide means for excluding moisture from the converter, and so protecting it that it may be kept in damp places, or even surrounded by water, without injury.

The accompanying drawing is a section of a converter and inclosing-case embodying the features of the invention.

Referring to the figure, C represents a converter, which, while it may be of any convenient form, is preferably constructed with a core composed of thin iron plates $b\ b$, magnetically separated from each other, and carrying the primary and secondary coils $c$, the terminals of which are shown at $p'\ p^2$ and $s'\ s^2$. This invention is not, however, confined to any particular form of converter. Whatever be the form of converter adopted, it is first preferably inclosed in a gas or air tight case, D. This may with advantage consist of thin sheet metal, lead, copper, or other suitable material securely soldered. The case D, after the converter is in place, may be filled with a gas, serving to keep out moisture. This last precaution may not be necessary, however, in all instances.

Surrounding the case D is an iron or other strong box, E, which is of such size as to leave a space between the two. This space is designed to be filled with some material, such as tar, pitch, insulating compounds, or other suitable material adapted to exclude moisture. When a more or less solid material is used, it is melted and poured into the case and allowed to harden in position. This completely prevents moisture from reaching the converter.

The case E is preferably made in two sections, E' and E², of cast-iron, and these are bolted or otherwise securely fastened together. The joint between the two is sealed in any well-known manner.

The wires $p'\ p^2$ and $s'\ s^2$ from the primary and secondary coils of the converter are led through suitable apertures to an outer box, F, in which the switches and circuit-controlling devices are to be placed. The conductors of the converter lead through a plate, $f$, placed at the inner end of this box. The outer end of the box is closed by a cap, G. A washer, $g$, secures a tight joint at this point and prevents air and moisture from entering the box. When the circuit-controlling devices require attention, they may be reached by removing the cover G, without breaking into the converter-box or the box E. The cover G may be constructed with a glass plate, $g'$, through which the circuit-controller may be seen without removing the cover.

It may in some instances be desirable to lead one or more ventilating-pipes, $h$, from the converter through both cases. These are useful when it is not desired to surround the converter by air directly, or when it may be desired to fill the case D with gas from any convenient source—such as a gas-main, for instance.

I claim as my invention—

1. The combination, with an electrical converter, of an air-excluding case surrounding the same, and a gaseous fluid within the case, replacing the air.

2. The combination of an electrical converter, a sealed case inclosing the same, and a moisture-excluding substance surrounding the case.

3. The combination, substantially as described, of an electrical converter, an inclosing-case for the same, a wall surrounding said case, and a filling of moisture-excluding material between said case and wall.

4. The combination, substantially as described, of an electrical converter, a surrounding wall inclosing the same, and a moisture-excluding substance within said wall.

5. A case for electrical converters, in combination with an air-tight compartment for receiving the terminals of the primary and secondary conductors and a wall between the two.

6. A case for electric converters constructed in two sections, one section carrying an air-tight compartment for receiving the terminals of the primary and secondary conductors.

7. The combination of an electric converter, an air-tight covering for the same, a case surrounding the same, and one or more tubes leading from the converter through said case.

In testimony whereof I have hereunto subscribed my name this 27th day of October, A. D. 1886.

GEO. WESTINGHOUSE, Jr.

Witnesses:
 CHARLES A. TERRY,
 WALTER D. UPTEGRAFF.